Figure 1:
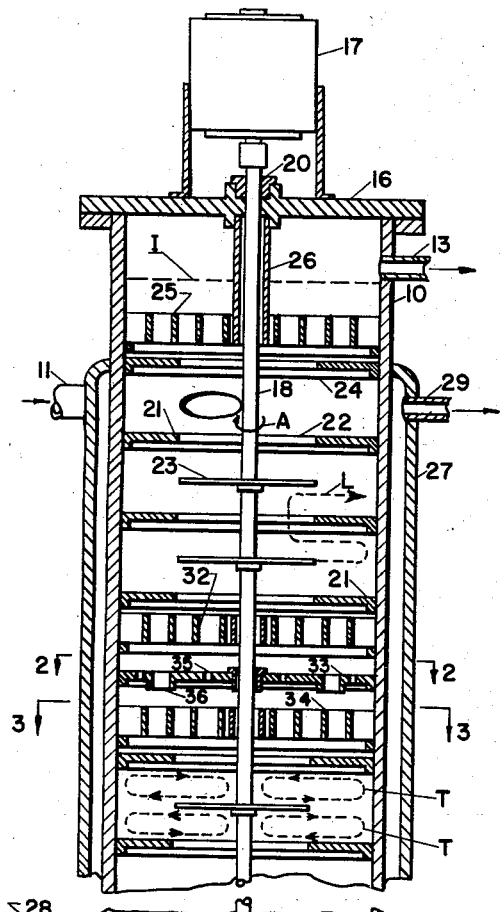

July 7, 1959 H. A. WISTRICH ET AL 2,893,846
FLUID MIXER WITH ROTATING BAFFLES
Filed June 21, 1956

INVENTORS
HARRY A. WISTRICH
RICHARD B. OLNEY
BY: Oswald H. Milmore
THEIR ATTORNEY

United States Patent Office 2,893,846
Patented July 7, 1959

2,893,846
FLUID MIXER WITH ROTATING BAFFLES

Harry A. Wistrich, Walnut Creek, and Richard B. Olney, Oakland, Calif., assignors to Shell Development Company, New York, N.Y., a corporation of Delaware Application June 21, 1956, Serial No. 592,947

6 Claims. (Cl. 23—270.5)

This invention relates to internally baffled, multistage fluid mixing apparatus suitable, for example, as reactors or as contacting apparatus to effect intimate contact between two or more at least partially immiscible fluid phases. When used as a reactor a single fluid phase may be passed through the central stages; the device then is a homogeneous reactor. However, several phases may be flowed through the reactor concurrently. When used as a contacting device, e.g., to effect chemical reactions or for solvent extraction, two phases are present, and usually flow countercurrently through the several stages. All applications are herein generically referred to as fluid mixing apparatus.

Mixing apparatus of this type have a series of annular stator baffles having central openings and mounted at intervals transversely within an elongated vessel, which is usually vertical, and a rotor which includes a shaft extending through the said openings and carrying fast for rotation therewith a plurality of transverse, generally flat rotor baffles distributed among the compartments defined by the stator baffles and so mounted that they are axially spaced from the adjacent stator baffles, with which they cooperate to form mixing zones. Such apparatus is sometimes known as a rotating disc contactor. The general principles of construction and operation and the vortex patterns created by the baffles when used as a contactor are disclosed in U.S. Patents Nos. 2,601,674, 2,729,544 and 2,729,545 and will not be described in detail herein.

As is more completely set forth in the cited patents, the rotor baffles produce within the several compartments vortex patterns which cause one phase to be dispersed intimately within the other, and the dispersed and continuous phases gravitate into adjoining compartments in accordance with their relative densities. Such gravitating flow is satisfactory when the operation involves reasonably balanced net rates of flow of the two phases countercurrently through the vessel. In some operations, however, the net or throughput rate of flow of one of the phases, either the dispersed or the continuous one, is insufficient to maintain a composition gradient through the series of compartments when known constructions of the apparatus are used. For example, it was found that when one phase flows only intermittently or very slowly, such as at one-tenth of the flow rate of the other, excessive axial mixing occurs. The composition of the slowly moving phase then tends to become or becomes uniform throughout the several compartments, so that the contactor is in effect operating at a very small number of stages or as a single stage; this phenomenon occurs although the same contactor can be operated at a larger number of theoretical stages with the identical ratio of phases present within the vessel but with increased flow of the above-mentioned phase. The difficulty is especially severe in fluid systems that are difficult to mix; in such cases high mixing intensities produced, e.g., by high rotor speeds, are necessary but promote equalization of the composition throughout the several compartments.

The situation of low net rate of flow of one phase, considered in the preceding paragraph, is met with whenever a fluid stream is treated with a disproportionately smaller volume of a treating fluid, e.g., when hydrocarbon oil is treated with sulfuric acid or gasoline is treated with caustic.

Axial mixing is also a problem when the device is used as a reactor wherein only one phase occurs or wherein several phases flow concurrently, since any passage of fluid counter to the main flow direction results in unequal residence times for different parts of the reaction mixture.

It is a general object of the invention to overcome the above-noted difficulty by arranging a calming device at an intermediate part of the vessel in such a way as to limit axial mixing. Specific objects are to limit back-mixing of the slowly moving phase and thereby to increase the number of theoretical contacting stages realized when internally baffled apparatus of the type indicated is used as a contacting apparatus and the rate of throughput of one phase is excessively low in relation to the rate of throughput of the other phase, especially, when a high mixing intensity is required; and to limit back-mixing of the fluid passing through the vessel when used as a homogeneous or concurrent-flow reactor so as to effect a more uniform residence time.

In summary, according to the invention the general object is attained by mounting between a pair of compartments a calming structure which arrests lateral fluid currents—these being largely rotational—and decreases the mixing intensity in the fluid which flows between the compartments. Several arrangements of the calming structure may be used. In one embodiment the structure includes one or more series of baffles, e.g., arranged crisscross to one another in the manner of an egg-crate that extends over the full cross sectional area of the column, the baffles having surfaces that are extended in the general direction of the vessel axis, spaced apart sufficiently to permit free flow of fluid in the said direction, i.e., no capillary flow or flow resembling passage through a coalescing mat is involved when the liquid tranverses these baffles. In another arrangement, which can be used alone or in conjunction with that just described, calming is achieved or further promoted by applying between the compartments a perforated plate having tubes which receive the continuous fluid phase from one side of the plate to a point beyond the other side of the plate, while the dispersed fluid flows in the opposite direction through the perforations in the plate.

The invention is founded on the observation that the tendency of a phase, such as the slowly-moving phase in a contacting operation, to become uniform throughout the series of contacting compartments is due to back-mixing, in which some of the said phase flows between compartments in the reverse axial direction, i.e., toward the end of the vessel at which it was admitted. When this axial mixing occurs at a rate that is high in relation to the net rate of flow or throughput rate of the phase in question, the composition is more or less equalized among all or several compartments. The rate of axial or back-mixing can be expressed in terms of the intercompartment fluid intermixing rate, which is defined as the ratio of the reverse flow of a given fluid phase between adjacent compartments to the net forward flow of said phase through the vessel. It is evident that the same condition prevails in the case of a uniflow reactor; here reverse flow leads to a wider spread between the maximum and minimum residence times within the reactor.

By reducing the mixing intensity through the use of calming structures at one or more intermediate sections of the vessel, the tendency toward back-mixing through these sections is reduced. The reduction of inter-compartment fluid intermixing or back-mixing by using lower mixing intensities cannot be applied advantageously in all mixing zones of the vessel for the reason that the reduced mixing intensity has an adverse influence on the overall characteristics of the mixer. The instant invention purports to maintain good mixing or contacting conditions in at least certain zones of the vessel, herein called the high-intensity mixing zones, and to separate these zones from one another by others, herein called staging zones, which improve the overall operation by reducing back-mixing and thereby insuring the more uniform forward flow of all portions of the phase and the existence of different compositions in the several high-intensity mixing zones.

The calming structures of the instant invention should be distinguished from coalescing and settling structures, as are used in prior contactors in alternation with compartments containing mixing paddles. While in such prior art contactors the dispersion from a mixing compartment was discharged through a passage separate from those through which the fluids entered the compartments, so as to set up a definite directed flow path therein, the instant apparatus operates on the principle of the countercurrent, gravitating flow of the two fluids through the same openings in the stator baffles which limit the mixing compartments, and the calming structure is provided merely to limit the amount of back-mixing, that is, to reduce or eliminate the flow of a fluid between compartments against the direction in which it tends to gravitate.

The invention will be described as applied to apparatus wherein all compartments have rotor discs, all rotor baffles are of like size and small enough to pass through the central openings in the stator baffles, and all stator baffles are alike; these are not, however, absolute requirements for the utility of the instant invention.

Figure 2:
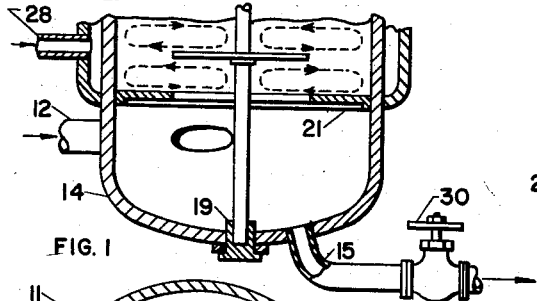
Figures 4, 5:
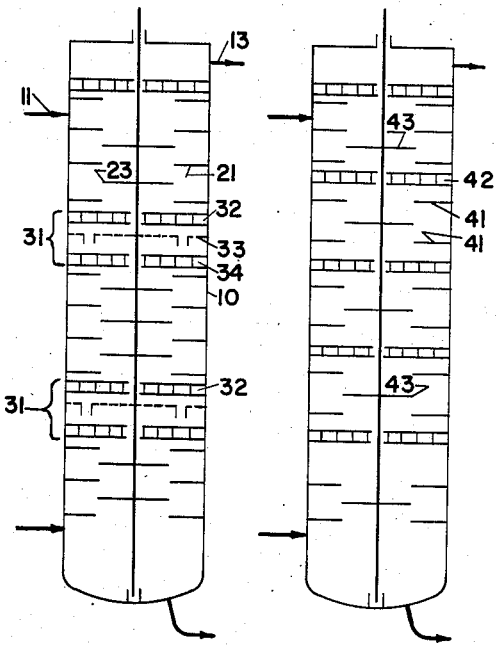
Figure 3:
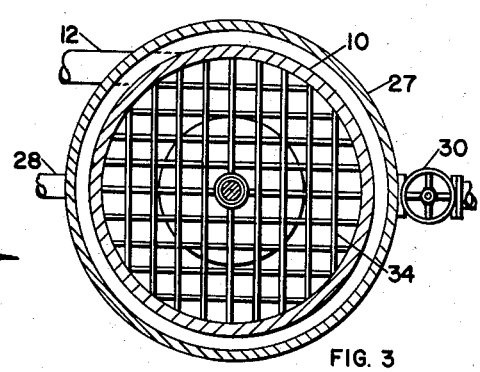

The invention will be described in further detail with reference to the accompanying drawing forming a part of this specification and showing certain preferred embodiments by way of example, wherein:

Figure 1 is a vertical sectional view of the contacting apparatus constructed in accordance with the invention;

Figures 2 and 3 are transverse sectional views taken on the lines 2—2 and 3—3 of Figure 1;

Figure 4 is a diagrammatic vertical sectional view showing the arrangement of the calming structures in accordance with the embodiment of Figures 1–3; and Figure 5 is a diagrammatic vertical sectional view showing an alternative arrangement of the calming structures.

Referring to Figures 1, 2, 3 and 4, the vessel includes a vertical cylindrical wall 10, circular in cross section, having upper and lower inlet pipes 11 and 12, respectively, which may optionally be tangential, as shown, an upper discharge pipe 13 and, in the bottom wall 14, a lower discharge pipe 15. The vessel is closed by a top plate 16 carrying an electric motor 17 which is coupled to a central, vertical shaft 18. This shaft is rotatably mounted in bearings 19 and 20. A plurality of horizontal, flat, annular stator baffles 21 is mounted immovably within the vessel at suitable intervals, which are equal in this embodiment. These baffles are imperforate except for central, circular openings 22, which are large in relation to the cross section of the shaft. The baffles 21 divide the vessel into a vertical series of compartments which communicate consecutively through said openings. The shaft 18 carries fixed thereto a plurality of rotor baffles 23 in the form of flat, circular, imperforate discs, the shaft and rotor baffles together consisting the rotor. In the embodiment being described the diameters of the openings 22 are equal, as are those of the baffles 23, the latter being somewhat smaller so that baffle 23 can be passed through the openings; however, these features are not in every case essential to the invention. A stator baffle 24 and a current-suppressing element such as an egg-crate structure 25 may be optionally mounted above the inlet 11. Further, a tube 26 may surround the upper part of the shaft 18. The vessel may have a jacket 27 fitted with pipes 28 and 29 for the circulation of a heating or cooling fluid.

At one or more intermediate levels, such as the two levels indicated in Figure 4, there are mounted calming structures 31. Each such structure may include three superposed elements, viz., a first baffle tray 32, a perforated plate 33, and a second baffle tray 34; however, in certain cases any one or two of these elements may be omitted. Each of the baffle trays comprises a plurality of baffles arranged preferably in criss-crossing relation, such as the egg-crate arrangement shown, the surfaces of which are spaced laterally apart sufficiently to permit the free vertical passage of a fluid dispersion without obstruction and without significant coalescence of the dispersed phase. The surfaces are elongated in the generally vertical direction for distances sufficient to arrest the lateral or rotational movement of the fluids; this length preferably is at least as great as the lateral spacing between surfaces. The plate 33 has a plurality of small openings 35 of any suitable outlines, e.g., slits, and a plurality of somewhat larger ducts 36 which protrude downwards from openings, to function as downcomers for the fluid which forms the continuous phase.

Operation as a contactor is as follows: It is assumed that the heavier fluid is to form a continuous phase and that the lighter fluid is to be dispersed therein. The column is filled through inlet 11 with the heavier fluid, the shaft 18 is rotated by the motor 17 in a direction indicated by the arrow A (this being preferably the same as the tangential direction of the inlet pipes 11 and 12) and the lighter fluid is admitted continuously or intermittently through the inlet 12, the admission of heavier fluid at 11 being continued. Toroidal vortices T are thereby set up with each compartment, resulting in the dispersion of the lighter fluid in the heavier. The greater part of the dispersion is recirculated within the vortices and the balance gravitates from stage to stage. Thus, the net path for a particle of lighter fluid between compartments is as indicated by the dashed line L. These flow patterns are further described is the above-cited patents. The relatively quieter space beneath the lowermost baffle 21 contains only the heavier fluid, commingled above the inlet 12 with large bubbles or globules of the lighter fluid. The heavier fluid is discharged through the outlet at a rate controlled by the valve 30. The dispersion rising past the upper inlet 11 has the rotational movement thereof checked by the structure 25; this permits the dispersed droplets to settle above the interface I. The lighter fluid is withdrawn through the outlet 13 and the heavier fluid settles back through the structure 25, so that there is no net vertical flow thereof at this level.

As was noted earlier, when one of the fluid phases flows slowly or intermittently, back-mixing, i.e., axial mixing thereof in the reverse direction, would tend to equalize among the several compartments the composition of that phase when the rotor baffles are operated at speeds sufficient for good mixing if no countermeasures were taken. This tendency is effectively counteracted by the instant arrangement in that the baffle trays 32 and 34 arrest the lateral currents of the fluids and thereby set up becalmed zones in the small passages between the baffles. This sharply reduces the tendency for a fluid to be entrained by the other and carried along in a direction opposed to its own settling direction. It should be noted that these baffle trays neither coalesce the dispersed fluid nor effect segregation of the fluids into layers. One or both of these trays, even without the plate 33, thus reduce back-mixing.

The plate 33, when provided, further positively limits back-mixing. The dispersed fluid, after ascending through the lower baffle tray 34, settles upwards against the plate and passes through the openings 35; a thin layer of the dispersed liquid is thus collected on the underside of the plate. The continuous fluid, after descending through the upper baffle tray 32, settles onto the upper side of the plate and flows through the downcomer ducts 36. The plate 33 is most effective when used between the baffle trays 32 and 34 but may be used alone.

It is evident that the two calming structures 31 constitute staging zones which divide the vessel into three zones capable of being operated under high-intensity mixing conditions, leading to good contacting efficiencies, and that the fluids within the latter zones will be maintained at progressively different compositions.

It should be noted that either the asceding, dispersed fluid phase or the descending, continuous fluid phase may be that which flows through the vessel at the lower rate.

While the foregoing description pertained to the dispersal of the lighter fluid, it is evident that the invention is equally applicable to the case where the heavier fluid is dispersed, as is disclosed in the aforementioned patents. In this case the baffle 24 and structure 25 are mounted at the bottom, below the inlet 12, and the interface I is situated below the said structure. Also, it is then preferable to invert the plates 33, so that the ducts 36 project upwards for transporting the continuous phase. Dispersion of the heavier fluid is effected by admixing it only after the vessel has been filled with the lighter fluid.

It may be further noted that the invention may be applied to contactors of various forms, including particularly those with streamlining bodies or flat guide rings, in accordance with the above U.S. patents, Nos. 2,729,544 and 2,729,545, respectively.

In the arrangement according to Figure 5, the stator baffles 41 are located as previously described for the baffles 21. The rotor baffles 43, which may also be alike as to shape and size, are mounted on the rotor shaft at intervals, as shown, to lie within alternate compartments. The intervening compartments contain baffle trays 42, which can be constructed as previously described for the trays 32 and 34. The intervening compartments containing the baffles therefore constitute staging zones which limit axial mixing, and they divide the vessel into a plurality of high-intensity mixing zones, each comprising a single mixing compartment. It is evident that a plurality of consecutive mixing compartments can be combined to form longer high-intensity mixing zones by using fewer baffle trays. This arrangement is suitable particularly for fluids that are easily contacted but which require a larger number of stages.

The same considerations apply when the device is used as a reactor. Thus, when used as a homogeneous reactor only one set of flow connection, 12 and 13 or 11 and 15, is needed, and the rotor is used for the purpose of mixing the reacting stream to establish within each compartment uniformity in composition and temperature, the latter being controlled by the temperature of fluid circulated within the jacket 27.

We claim as our invention:

1. A fluid mixing apparatus comprising: an axially elongated vessel one end of which is higher than the other; a plurality of transverse, axially spaced, annular stator baffles fixed within said vessel, having central openings, and defining a series of compartments which are in consecutive communication through said openings; means for admitting a fluid to be contacted at one end of said series for flow through the compartments and for discharging the fluids after such flow; a rotor including a rotatably mounted shaft extending through said openings and carrying fast for rotation therewith a plurality of generally flat rotor baffles distributed among said compartments and situated therein in axially spaced relation to said stator baffles, said openings being large in relation to the cross section of the shaft for the free flow of fluid through the openings; and a calming structure situated between a pair of said compartments and including a plurality of baffles having surfaces that are elongated in the general direction of the axis of the vessel for arresting lateral fluid currents and are spaced apart so as to provide a multiplicity of open passages for the free flow of fluid between the compartments of said pair.

2. A fluid mixing apparatus according to claim 1 wherein said clamping structure includes a second plurality of baffles situated on one side of the first-mentioned baffles and in axially spaced relation so as to leave a becalmed space therebetween, said second baffles having the elongated surfaces and providing the open passages as specified for the first-mentioned baffles.

3. A fluid contacting apparatus comprising: an axially elongated vessel one end of which is higher than the other; a plurality of transverse, axially spaced, annular stator baffles fixed within said vessel, having central openings, and defining a series of compartments which are in consecutive communication through said openings; means for admitting fluids to be contacted at opposite ends of said series for countercurrent flow through the compartments and for discharging the fluids after such countercurrent flow; a rotor including a rotatably mounted shaft extending through said openings and carrying fast for rotation therewith a plurality of generally flat rotor baffles distributed among said compartments and situated therein in axially spaced relation to said stator baffles, said openings being large in relation to the cross section of the shaft for the free flow of fluid through the openings; and a calming structure situated between a pair of said compartments and including a plurality of baffles having surfaces that are elongated in the general direction of the axis of the vessel for arresting lateral fluid currents and are spaced apart so as to provide a multiplicity of open passages for the free flow of dispersed fluid between the compartments of said pair, a plate spaced from said baffles toward one end of the vessel, said plate having a plurality of small openings therethrough for the passage of the fluid which gravitates toward said one end of the vessel, and duct means for conducting the other fluid toward the said baffles from the side of the plate which is remote from the baffles.

4. A fluid contacting apparatus according to claim 3 wherein said calming structure includes a second plurality of baffles situated on the side of said plate toward said one end of the vessel and having the elongated surfaces and providing the open passages as specified for the first-mentioned baffles.

5. A fluid contacting apparatus comprising: an axially elongated vessel one end of which is higher than the other; a plurality of transverse, axially spaced, annular stator baffles fixed within said vessel, having central openings, and defining a series of compartments which are in consecutive communication through said openings; means for admitting fluids to be contacted at opposite ends of said series for countercurrent flow through the compartments and for discharging the fluids after such countercurrent flow; a rotor including a rotatably mounted shaft extending through said openings and carrying fast for rotation therewith a plurality of generally flat rotor baffles distributed among said compartments and situated therein in axially spaced relation to said stator baffles, said openings being large in relation to the cross section of the shaft for the free flow of fluid through the openings; and a calming structure situated between a pair of said compartments and including a transverse plate, said plate having a plurality of small openings therethrough for the passage of dispersed fluid, and duct means for conducting the other fluid from the side of the plate toward which said dispersed fluid gravitates to a point displaced axially on the other side of the plate.

6. A fluid contacting apparatus comprising: a vertically elongated vessel shaped internally as a surface of revolution about a vertical axis; a plurality of horizontal, generally flat, annular stator baffles fixed within said vessel and extending at vertical intervals from the said interior surface radially to central, circular openings, said baffles defining a series of compartments which are in consecutive communication through said openings; means for admitting fluids to be contacted at vertically spaced points in said vessel for countercurrent flow through said compartments and for discharging the fluids after such countercurrent flow; a shaft extending through said openings, said openings being large in relation to the cross section of the shaft for the free flow of fluid through the openings; means mounting said shaft for rotation about said vertical axis; a horizontal, substantially flat, circular rotor baffle for each of a plurality of said compartments mounted on said shaft for rotation therewith at locations spaced by substantial vertical distances from the adjoining higher and lower stator baffles, there being an intermediate compartment that does not contain a rotor baffle; and a calming structure within said intermediate compartment including a plurality of baffles distributed over the cross section of the vessel and having surfaces that are elongated generally vertically for arresting horizontal fluid currents and are spaced apart horizontally so as to provide a multiplicity of generally vertical open passages for the free flow of dispersed fluid between compartments on opposite sides of said intermediate compartment.

References Cited in the file of this patent

UNITED STATES PATENTS

| | | |
|---|---|---|
| 1,893,667 | Darlington | Jan. 10, 1933 |
| 2,154,713 | Van Wijk et al. | Apr. 18, 1939 |
| 2,218,080 | Bottaro | Oct. 15, 1940 |
| 2,601,674 | Reman | June 24, 1952 |